A. BOWSER.
MEASURING APPARATUS FOR LIQUIDS.
APPLICATION FILED MAR. 20, 1909.
1,047,492.
Patented Dec. 17, 1912.
2 SHEETS—SHEET 1.
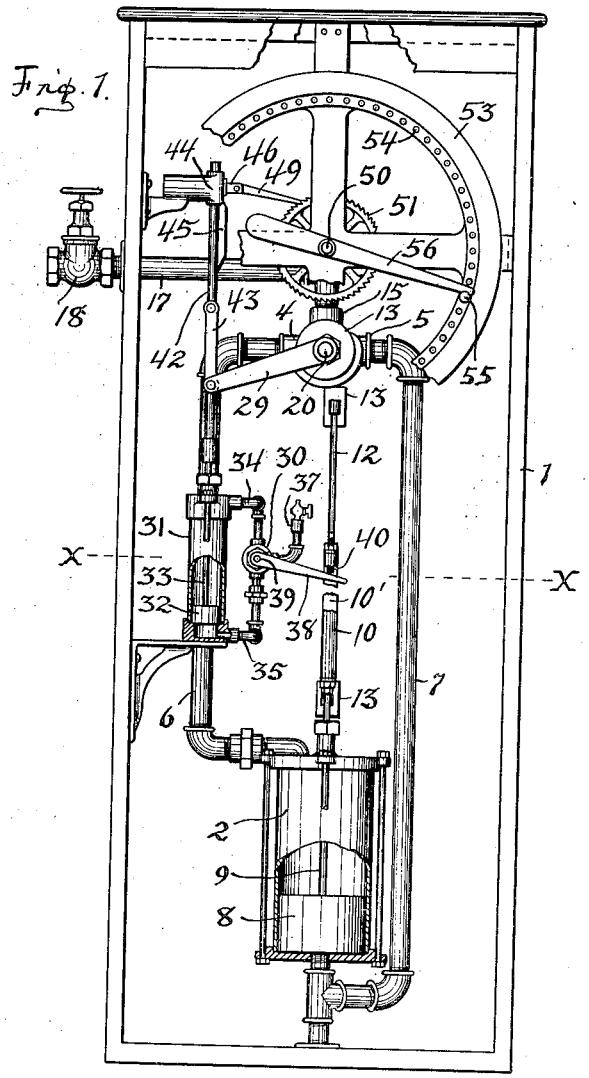
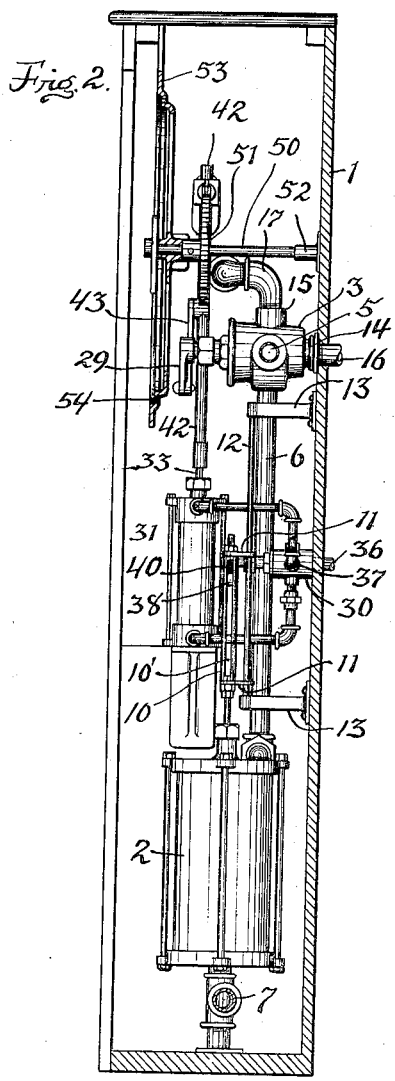
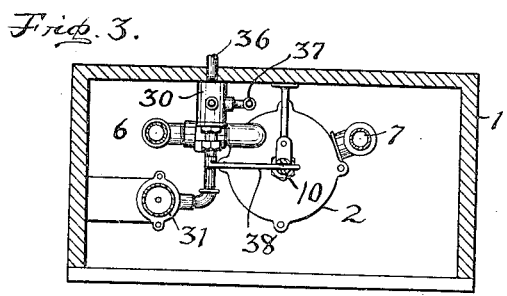
WITNESSES:
J. M. Dickens,
Wm. H. Brueman
Augustus Bowser INVENTOR.
BY J. G. Burns
ATTORNEY.

A. BOWSER.
MEASURING APPARATUS FOR LIQUIDS.
APPLICATION FILED MAR. 20, 1909.
1,047,492.
Patented Dec. 17, 1912.
2 SHEETS—SHEET 2.
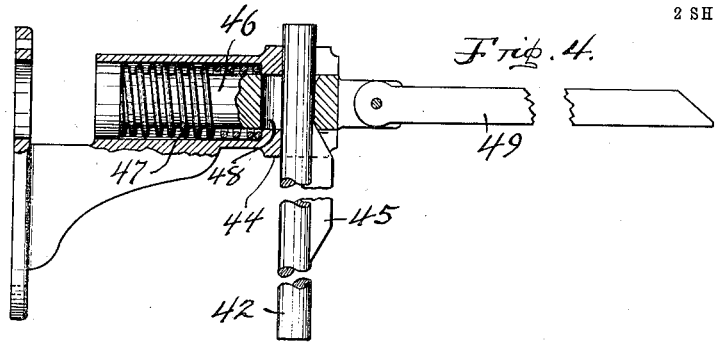
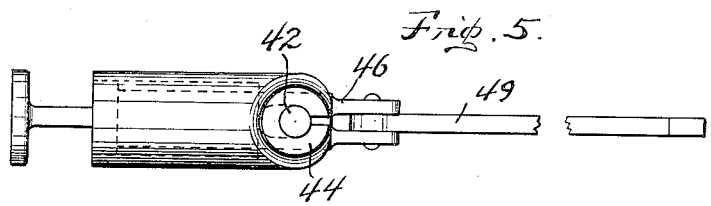
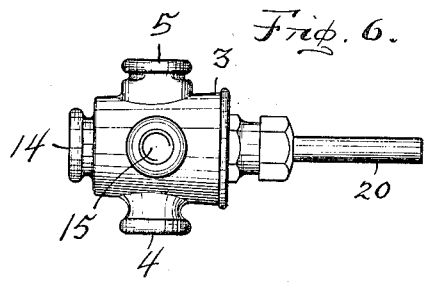
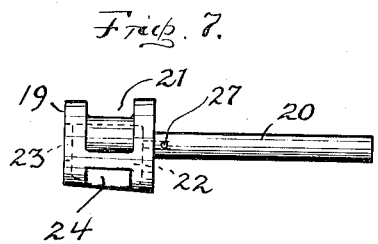
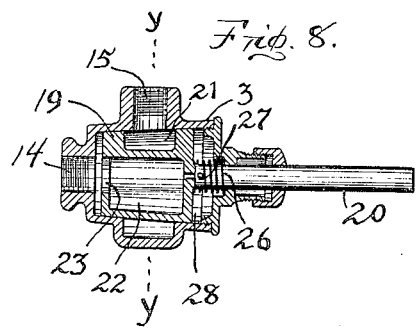
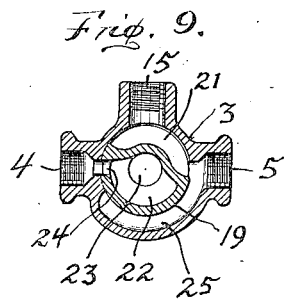
WITNESSES:
Augustus Bowser INVENTOR.
BY W. G. Burns
ATTORNEY.

UNITED STATES PATENT OFFICE.

AUGUSTUS BOWSER, OF FORT WAYNE, INDIANA, ASSIGNOR TO THE GEYSER OIL TANK COMPANY, A CORPORATION OF INDIANA.

MEASURING APPARATUS FOR LIQUIDS.

1,047,492. Specification of Letters Patent. Patented Dec. 17, 1912.

Application filed March 20, 1909. Serial No. 484,682.

To all whom it may concern:

Be it known that I, AUGUSTUS BOWSER, a citizen of the United States of America, and resident of Fort Wayne, in the county of Allen and State of Indiana, have invented certain new and useful Improvements in Measuring Apparatus for Liquids, of which the following is a specification.

This invention relates to improvements in measuring apparatus for liquids, and the object thereof is to provide apparatus of its class that will automatically deliver a predetermined quantity of liquid accordingly as adjusted.

The object of this invention is accomplished by the construction illustrated in the accompanying drawings, in which—

Figure 1. is a front elevation of the machine, shown partly in section and with other parts cut away; Fig. 2. is a similar view in a plane at right angles to that of Fig. 1.; Fig. 3. is a cross sectional view of Fig. 1. on the line X—X; Fig. 4. is a detail view showing the actuating mechanism in part for the automatic controlling device.; Fig. 5. is a plan view of Fig. 4.; Fig. 6. is a detail showing an external view of a valve-body used in the machine; Fig. 7. is a view of the valve for same; Fig. 8. is a longitudinal section through the valve-body and valve; and Fig. 9. is a cross-sectional view of Fig. 8. on the line Y—Y.

Similar numerals of reference indicate corresponding parts throughout the several views, and referring now to the same: 1 is a case containing the apparatus, 2 is the measuring cylinder, and 3 is a valve-body which has connection at its oppositely disposed side ports 4 and 5 respectively with the top and bottom of the cylinder 2 by means of corresponding pipes 6 and 7. Within the cylinder 2 is a reciprocating plunger 8 having attached thereto a piston-rod 9 which extends through the top of the cylinder and has at its upper end a slotted head 10. At the top and bottom of the head 10 are corresponding lugs 11 which slide upon a guide-rod 12, the latter being supported by brackets 13 which extend from the back of the case 1. The valve-body 3 has also an inlet port 14 and a discharge port 15, the former of which enters the back end of the body and the latter extends through the top thereof. A supply pipe 16 is connected with the inlet port and a discharge pipe 17 extends from the discharge port 15 and leads through the side of the case 1 and has at its outer end a valve 18. Within the valve-body 3 is a valve 19 which is adapted to be oscillated by means of its stem 20. The valve has in its upper side a recess 21 and in its lower part a hollow chamber 22. In the rear end of the valve is a port 23 that opens into the chamber 22, and at one side of the valve is a port 24 that opens into said chamber. The recess 21 and the port 24 are arranged relative to one another so that when the said port registers with the side port 4 in the valve-body, communication will become established between the supply pipe 16 and pipe 6 through the chamber 22, while communication will also become established between the pipe 7 and the discharge pipe 17 through the recess 21. In the lower part of the valve-body is a recess 25 that extends to the side port 5, and when the valve 19 is turned so that its side port 24 registers with the recess 25 at its commencement, communication will then become established between the supply pipe 16 and the pipe 7 through the chamber 22 and recess 25, while communication will also become established between the pipe 6 and discharge pipe 17 through the recess 21.

It will therefore be understood that the valve as arranged is a four-way valve, and that while liquid enters the top of the cylinder from the supply pipe, a corresponding quantity of liquid will pass from the lower part of the cylinder and become discharged through the discharge pipe, and vice versa accordingly as the valve is turned, the alternative being with respect to the ends of the cylinder. The valve 19 is slightly tapered and fits within the valve-body, and a spring 26 acts to hold the valve seated snugly in the taper bore of the valve-body. Also there is a small port 27 extending from the chamber 22 and opening through the side of the stem 20 adjacent the valve to allow liquid to pass from said chamber into the space 28 between the front end of the valve-body and the corresponding end of the valve, the effect of which is to counteract the tendency of the liquid as it enters the valve under pressure, to force the valve forwardly in the valve-body.

30 is a four-way valve which is similar to the valve just described except that it is of smaller dimensions.

31 is an air cylinder having therein a reciprocating plunger 32 which is connected with a piston rod 33, the latter extending through the top of the cylinder. The valve 30 has connections with the cylinder 31 at the ends thereof by means of pipes 34 and 35 respectively, in similar manner as the connected relation between the other valve and the cylinder 2. The valve 30 has a supply pipe 36 and a discharge or exhaust pipe 37 that bear the same relation to said valve as has the other valve relation to corresponding pipes. The valve 19 is operated by an arm 29 which is attached to its stem 20, and the valve 30 is operated by a similar arm 38 which is attached to its stem 39. The swinging end of the arm 38 extends loosely through the slot 10′ of the head 10, and is adapted to be raised by the upward movement of the head by coming into contact therewith at the bottom of the slot, and lowered by the downward stroke of the head by coming into contact with the adjusting screw 40 located at the upper end of the head. To the upper end of the piston-rod 33 is attached a sliding rod 42 which has a bearing in a guide 44, and the arm 29 is connected to said rod by means of a link 43 so that the arm 29 will be actuated by the reciprocations of the rod.

The sliding rod 42 has projecting from one side a cam 45 that is adapted to engage and horizontally move a plunger 46 which is mounted in the guide 44, and said cam is so located on the rod that the plunger 46 will be moved forwardly approximately at the commencement of the upward stroke of the piston 32, and backwardly at the completion of the downward stroke of said piston, the return movement of the plunger 46 being effected by a compression spring 47 which acts to hold said plunger in normal position. The rod 42 extends through an opening 48 made in the plunger 46, said opening being of sufficient size to admit of the desired length of movement of the plunger. The outer end of the plunger 46 has pivoted thereto a pawl 49 which is adapted to impart to a shaft 50 a succession of movements in the direction of rotation, one movement to each forward reciprocation of the plunger 46, by engaging a ratchet wheel 51 fixed upon the shaft. The shaft 50 has a bearing 52 at the rear of the case 1, and another bearing at the center of a circular frame 53 which is mounted in fixed position in the front of the case. In the frame 53 is made an annular series of holes 54, equally spaced, and equally distant from the center of the shaft 50. A stop 55 is provided which is intended to be inserted in any one of the holes 54 and act to detain the hand 56 when the latter comes into contact therewith and thereby stop the movement of the shaft 50 to which the hand is rigidly fixed.

In the operation of this invention, the liquid to be measured enters the apparatus under pressure through the supply pipe 16, and may be supplied from any suitable source, and air under pressure from any suitable source is directed into the supply pipe 36. As the liquid flows inward it will pass through the valve 19 and pipe 7 into the lower end of the cylinder 2 and the plunger 8 will thereby be raised and the lower end of the cylinder filled with the liquid. The head 10 will also be raised because of the movement of the plunger 8, and the arm 38 will thereby be lifted so as to actuate the valve 30. Thus air will pass into the lower end of the cylinder 31 through the valve 30 and force the piston 32 upward which has the effect of lifting the arm 29 and also of turning the hand 56 unless the latter is detained by the stop 55, in which event the piston will be held from rising and the apparatus will become inactive. As the arm 29 is raised the valve 19 will become turned so that the liquid will be directed into the upper end of the cylinder 2 thus forcing the plunger 8 downward which has the effect of forcing the liquid beneath the plunger out through the discharge pipe 17, and also of moving the arm 38 downward so as to turn the valve 30. Thus, air will enter the upper end of the cylinder 31 and force the piston 32 downward to its former position. These movements are repeated in regular succession as long as the liquid and air are properly supplied and the hand 56 is not interrupted by coming into contact with the stop 55. A predetermined quantity of liquid will be discharged by the apparatus if the stop 55 is placed correspondingly in the proper hole in front of the hand 56 so as to arrest further action of the apparatus when such quantity of liquid shall have been discharged. The holes 54 are so spaced to the movements of the hand that each hole will represent one complete cycle of the apparatus, and the quantity of liquid discharged during one cycle constitutes the unit of measurement.

Having described my invention, what I claim as new and desire to secure by Letters Patent, is:

1. In apparatus of the class described, a measuring cylinder; a reciprocating plunger therein; a four-way valve having communicating connections respectively with the ends of said cylinder; a supply pipe in connection with the valve and adapted to have alternate communications therethrough with the ends of the cylinder accordingly as the valve is turned; a discharge-pipe in connection with the valve and adapted to have alternate communications therethrough with the opposite ends of the cylinder; an air cylinder having therein a reciprocating piston; valve mechanism in connection with the air cylinder for supplying the ends of the latter alternately with air under pressure and to afford means of exhaust; means in connection with the piston of the air cylinder for actuating the former valve; and means in connection with the plunger of the measuring cylinder for actuating said valve mechanism.

2. In apparatus of the class described, a measuring cylinder having therein a reciprocating plunger; an air cylinder having a reciprocating piston therein; a valve mechanism in connection with the measuring cylinder and adapted to alternately supply the ends of the same with liquid under pressure and to afford means of discharge from the corresponding opposite ends; another valve mechanism in connection with the air cylinder and adapted to alternately supply the ends of the same with air under pressure and to afford means of exhaust from the corresponding opposite ends; means in connection with the plunger of the measuring cylinder for actuating the latter valve mechanism; and means in connection with the piston of the air cylinder for actuating the valve mechanism of the measuring cylinder.

3. In apparatus of the class described, a measuring cylinder; a valve having connections with the cylinder and adapted to regulate the passage of liquid to and from the cylinder; a mechanism having relation with said valve to actuate the same; a frame having a series of spaced holes therein; a movable hand adapted to be actuated by the movement of said mechanism; and an adjustable stop in connection with the frame adapted to contact with the hand and thereby arrest the movement of the piston.

4. In apparatus of the class described, a measuring cylinder; a valve mechanism for regulating the passage of liquid to and from the cylinder; a pneumatic mechanism for actuating said valve mechanism; a frame; and an adjustable stop in connection with the frame adapted to arrest the operating movement of the pneumatic mechanism.

5. In apparatus of the class described, a measuring cylinder; a valve mechanism for regulating the passage of liquid to and from the cylinder; a pneumatic mechanism having actuating relation with the valve mechanism; a revoluble hand having relation with the pneumatic mechanism to be actuated thereby; and an adjustable stop adapted to contact with the hand and thereby arrest the actuating movement of the pneumatic mechanism.

6. In apparatus of the class described, a measuring cylinder; a valve mechanism for regulating the passage of liquid to and from the cylinder; an air cylinder; a reciprocating piston within said air cylinder, and having connection with said valve mechanism to actuate the same; and adjustable means adapted to arrest the movement of said piston.

In testimony whereof I affix my signature, in presence of two witnesses.

AUGUSTUS BOWSER.

Witnesses:
  Wm. H. Beusman,
  W. G. Burns.